(12) United States Patent
Besore et al.

(10) Patent No.: US 8,818,566 B2
(45) Date of Patent: Aug. 26, 2014

(54) APPLIANCE DEMAND RESPONSE RANDOMIZATION AFTER DEMAND RESPONSE EVENT

(75) Inventors: John K. Besore, Louisville, KY (US); Jeff Donald Drake, Louisville, KY (US); Michael F. Finch, Louisville, KY (US); Darin Franks, Louisville, KY (US); William Newton, Louisville, KY (US); Lucas Bryant Spicer, Louisville, KY (US); Timothy Dale Worthington, Louisville, KY (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 12/644,922

(22) Filed: Dec. 22, 2009

(65) Prior Publication Data

US 2011/0148199 A1 Jun. 23, 2011

(51) Int. Cl.
H02J 3/14 (2006.01)

(52) U.S. Cl.
CPC ............. *H02J 3/14* (2013.01); *H02J 2003/143* (2013.01); *Y04S 20/222* (2013.01); *Y02B 70/3225* (2013.01); *Y02B 70/3266* (2013.01); *Y04S 20/242* (2013.01)
USPC ............................ 700/295; 700/291; 700/296

(58) Field of Classification Search
USPC .......... 700/11, 19, 291, 295, 296; 702/57, 62; 705/412
See application file for complete search history.

(56) References Cited

U.S. PATENT DOCUMENTS

| | | | |
|---|---|---|---|
| 6,167,389 A | 12/2000 | Davis et al. | |
| 6,633,823 B2* | 10/2003 | Bartone et al. | 702/57 |
| 7,010,363 B2 | 3/2006 | Donnelly et al. | |
| 7,379,997 B2* | 5/2008 | Ehlers et al. | 709/224 |
| 7,653,443 B2* | 1/2010 | Flohr | 700/14 |
| 7,949,615 B2* | 5/2011 | Ehlers et al. | 705/412 |
| 8,116,917 B2* | 2/2012 | Rodgers | 700/291 |
| 2003/0109938 A1* | 6/2003 | Daum et al. | 700/11 |
| 2003/0233201 A1* | 12/2003 | Horst et al. | 702/62 |
| 2004/0139038 A1* | 7/2004 | Ehlers et al. | 705/412 |
| 2005/0033707 A1* | 2/2005 | Ehlers et al. | 705/412 |
| 2006/0106741 A1* | 5/2006 | Janarthanan | 705/412 |
| 2007/0203860 A1* | 8/2007 | Golden et al. | 705/412 |
| 2008/0272934 A1* | 11/2008 | Wang et al. | 340/870.11 |
| 2010/0217550 A1* | 8/2010 | Crabtree et al. | 702/62 |
| 2011/0153100 A1* | 6/2011 | Besore et al. | 700/291 |

* cited by examiner

*Primary Examiner* — Kavita Padmanabhan
*Assistant Examiner* — Christopher E Everett
(74) *Attorney, Agent, or Firm* — Global Patent Operation; Marc A. Vivenzio

(57) ABSTRACT

An energy management system and method for one or more appliances includes a controller for managing power consumption within a household. The controller is configured to receive and process a signal indicative of one or more energy parameters of an associated energy supplying utility, including at least a peak demand period or an off-peak demand period. The controller is configured to at least one of communicate to, control and operate one or more appliances in one of a plurality of operating modes, including at least a normal operating mode and an energy savings mode in response to the received signal. The one or more appliances operate in the normal operating mode during the off-peak demand period and operate in the energy savings mode during the peak demand period. The controller is configured to control the return of the one or more appliances to the normal operating mode after the peak demand period is over to prevent an energy surge for the associated energy supplying utility.

12 Claims, 3 Drawing Sheets

APPLIANCE DEMAND RESPONSE RANDOMIZATION AFTER DEMAND RESPONSE EVENT

BACKGROUND

The present disclosure relates to energy management, and more particularly to power consuming device control methods and electrical energy consumption systems. This disclosure finds particular application to controlling when power consuming devices are started after a demand response event.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

One outcome of utilities varying the price of electrical energy over time is a reduction in consumption during the on-peak times and a greater consumption during the off-peak times. Presently, to take advantage of the lower cost of electricity during off-peak times, a controller can switch the actual energy supply to the power consuming device on and off and/or switch the operating mode of the power consuming device between a normal operating mode and a resource savings mode. For example, during off-peak times the controller can decrease the setpoint temperature of an HVAC system and during on-peak times the controller can increase the setpoint temperature and/or turn the system off.

While the initiation of operation of power consuming devices immediately after a change in rate, for example, do not appear to affect the individual consumer, the operation of many power consuming devices in this manner can create a tremendous load on the power distribution network. For example, some power consuming devices, such as HVAC systems, require six times their normal operating currents during start up. When a number of those power consuming devices switch from a resource savings mode back to a normal operating mode, the influx of current may be up to six times the normal load on the power grid. This initial influx can compromise the integrity of the power grid and, at when the power grid is fully loaded, result in a reduction or shut off in the power supplied to consumers. These reductions and shut-offs of power are commonly known as brown-outs or black-outs. Therefore, there is a need to provide an improved system that can control when power consuming devices are started after a demand response event.

BRIEF DESCRIPTION

According to one aspect, an energy management system and method for one or more appliances comprises a controller for managing power consumption within a household. The controller is configured to receive and process a signal indicative of one or more energy parameters of an associated energy supplying utility, including at least a peak demand period or an off-peak demand period. The controller is configured to at least one of communicate to, control and operate one or more appliances in one of a plurality of operating modes, including at least a normal operating mode and an energy savings mode in response to the received signal. The one or more appliances operate in the normal operating mode during the off-peak demand period and operate in the energy savings mode during the peak demand period. The controller is configured to control the return of the one or more appliances to the normal operating mode after the peak demand period is over to prevent an energy surge for the associated energy supplying utility.

According to another aspect, an energy management control method for one or more appliances comprises determining a state for an associated energy supplying utility. The utility state is indicative of at least a peak demand period or an off-peak demand period. The one or more appliances operate in a normal mode during the off-peak demand period. The one or more appliances operate in an energy savings mode during the peak demand period. The return of the one or more appliances to the normal mode after the peak demand period is over is randomized to prevent an energy surge for the associated energy supplying utility.

According to yet another aspect, an energy management system and method for one or more appliances comprises a controller for managing power consumption within a household. The controller is configured to receive and process an energy signal. The signal has a first state indicative of a utility peak demand period and a second state indicative of a utility off-peak demand period. The controller at least one of communicates to, controls and operates one or more appliances in one of an energy savings mode and a normal operating mode based on the received signal being in the first and second states respectively. The controller is configured to control the return the one or more appliances to the normal operating mode to prevent an energy surge for the associated energy supplying utility by utilizing at least one character of a serial number of each of the one or more appliances and prescribing a randomization timeframe associated with the at least one character for returning to the normal mode.

DETAILED DESCRIPTION

Figure 1:
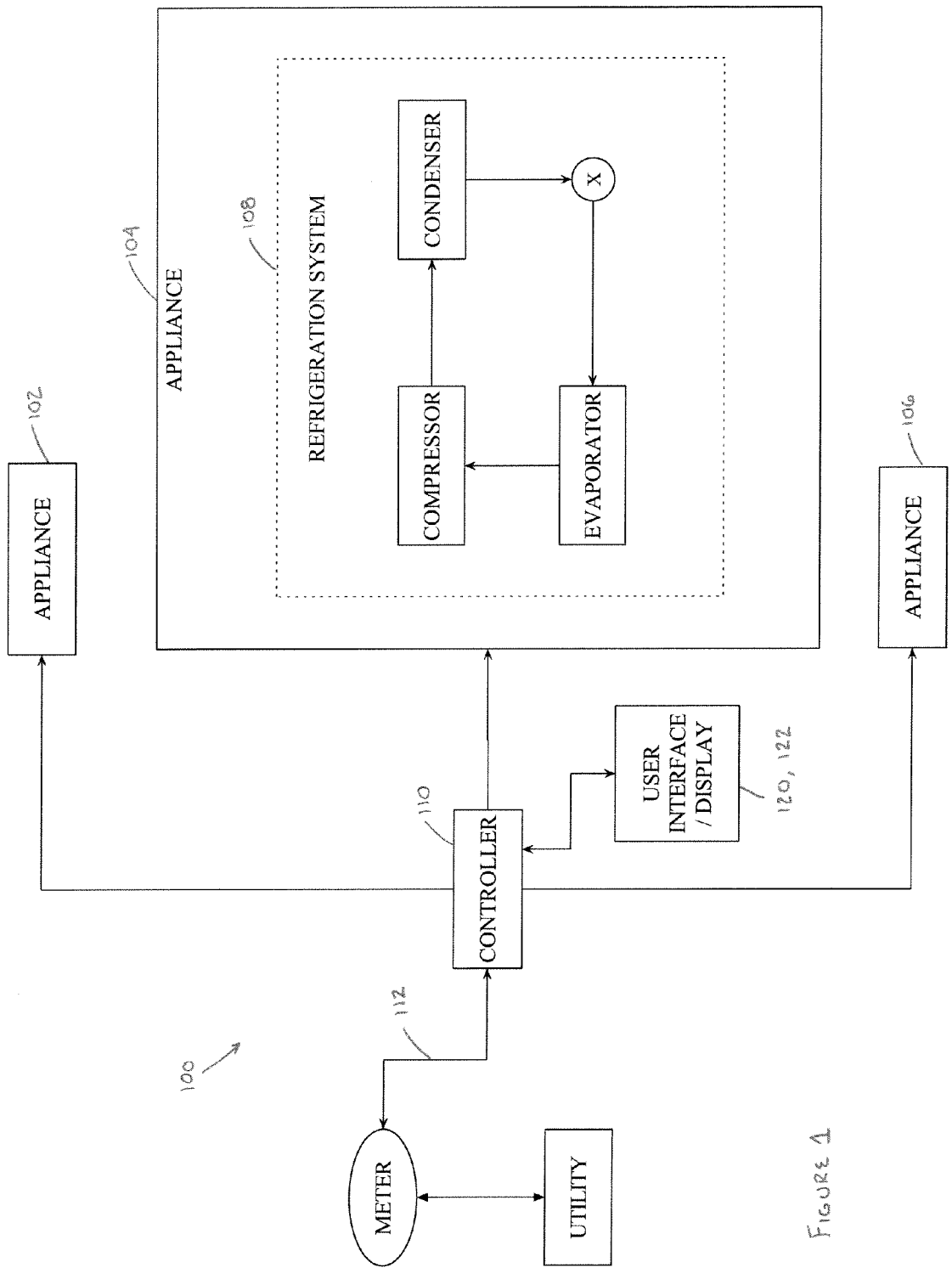
FIG. 1 is a schematic illustration of an exemplary energy management system for one or more appliances.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates an exemplary energy management system 100 for one or more appliances 102, 104, 106 according to one aspect of the present disclosure. Each of the appliances 102, 104, 106 can comprise one or more power consuming features/functions. For example, appliance 104 can be a refrigerator and/or an HVAC system including a refrigeration system 108. The energy management system 100 generally comprises a controller 110 for managing power consumption within a household. The controller 110 is operatively connected to each of the power consuming features/functions. The controller 110 can include a micro computer on a printed circuit board which is programmed to selectively control the energization of the power consuming features/functions.

The controller 110 is configured to receive and process a signal 112 indicative of one or more energy parameters and/or a utility state of an associated energy supplying utility, for example, including availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 110 is configured to at least one of communicate to, control and operate the appliances 102, 104, 106 in one of a plurality of operating modes, including at least a normal operating mode and an energy savings mode in response to the received signal. Specifically, each appliance can be operated in the normal operating mode during the off-peak demand state or period and can be operated in the energy savings mode during the peak demand state or period. As will be discussed in greater detail below, the controller 110 is configured to control the return of the appliances to the normal operating mode after the peak demand period is over to prevent an energy surge for the associated energy supplying utility.

If the controller 110 receives and processes an energy signal indicative of a peak demand state or period at any time during operation of the appliances 102, 104, 106, the controller makes a determination of whether one or more of the power consuming features/functions of each appliance should be operated in the energy savings mode and if so, it signals the appropriate features/functions of each appliance to begin operating in the energy savings mode in order to reduce the instantaneous amount of energy being consumed by the appliances. The controller 110 is configured to determine what features/functions should be operated at a lower consumption level and what that lower consumption level should be, rather than an uncontrolled immediate termination of the operation of specific features/functions. It should be appreciated that the controller 110 can be configured with default settings which govern normal mode and energy savings mode operation. Such settings in each mode can be fixed while others adjustable to user preference and to provide response to load shedding signals.

The controller 110 includes a user interface 120 having a display 122 and control buttons for making various operational selections. The display can be configured to provide active, real-time feedback to the user on the cost of operating each appliance 102, 104, 106. The costs are generally based on the current operating and usage patterns and energy consumption costs, such as the cost per kilowatt hour charged by the corresponding utility. The controller 110 is configured to gather information and data related to current usage patterns and as well as current power costs. This information can be used to determine current energy usage and cost associated with using each appliance in one of the energy savings mode and normal mode. This real-time information (i.e., current usage patterns, current power cost and current energy usage/cost) can be presented to the user via the display.

The duration of time that each appliance 102, 104, 106 operates in the energy savings mode may be determined by information in the energy signal. For example, the energy signal may inform the controller 110 to operate in the energy savings mode for a few minutes or for one hour, at which time each appliance 102, 104, 106 returns to normal operation. Alternatively, the energy signal may be continuously transmitted by the utility provider, or other signal generating system, as long as it is determined that instantaneous load reduction is necessary. Once transmission of the signal has ceased, each appliance returns to normal operating mode. In yet another embodiment, an energy signal may be transmitted to the controller 110 to signal each appliance 102, 104, 106 to operate in the energy savings mode. A normal operation signal may then be later transmitted to the controller to signal each appliance 102, 104, 106 to return to the normal operating mode.

The operation of each appliance 102, 104, 106 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 110 is configured to operate each appliance 102, 104, 106 in an operating mode corresponding to one of the price tiers. For example, the refrigeration system 108 of appliance 104 has a setpoint temperature. The controller 110 is configured to operate appliance 104 in the normal operating mode during each of the low and medium price tier and is configured to adjust the setpoint temperature of the refrigeration system 108 to an adjusted temperature in the energy savings mode during each of the high and critical price tier. If the utility offers more than two rate/cost conditions, different combinations of energy saving control steps may be programmed to provide satisfactory cost savings/performance tradeoff.

Figure 2:
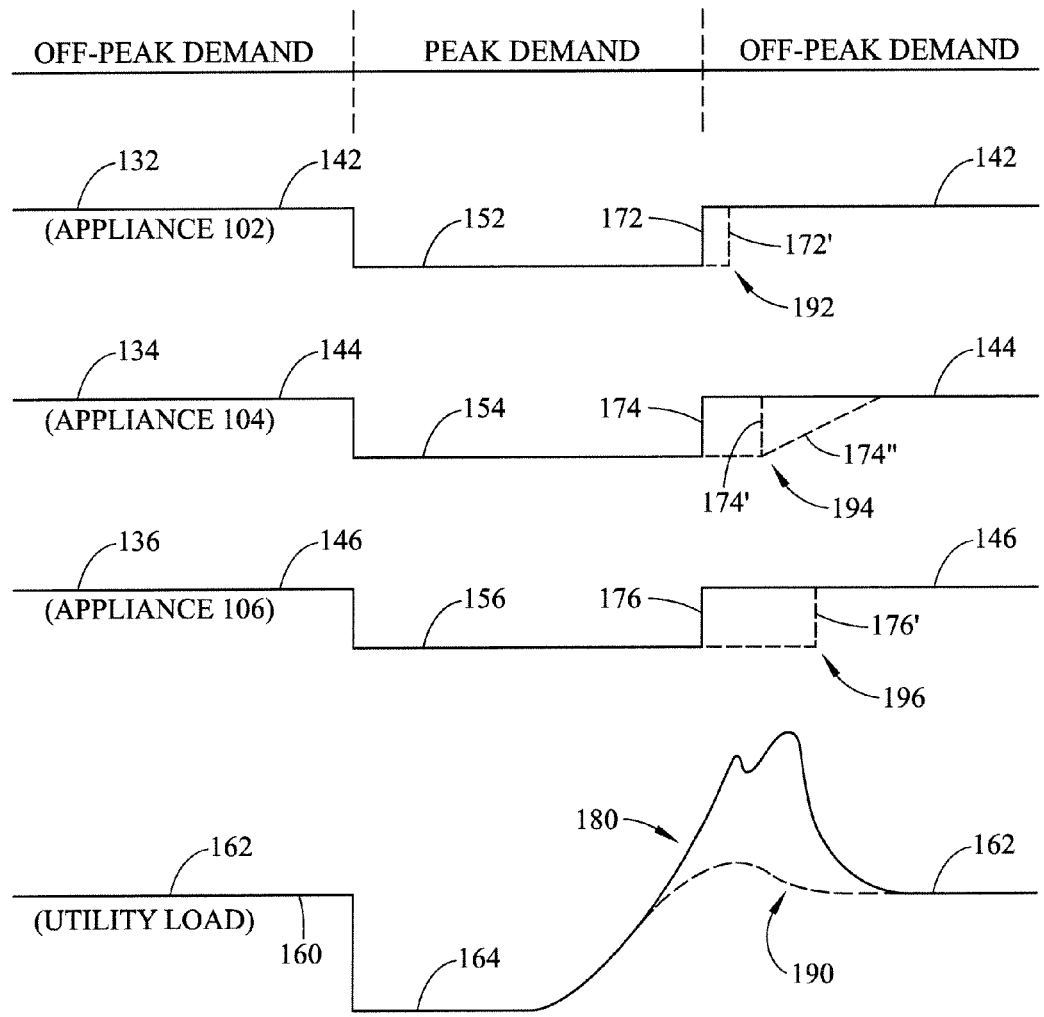
FIG. 2 is a schematic illustration of an exemplary demand managed central air conditioning system.

With reference to FIG. 2, the respective energy consumption load 132, 134, 136 of each appliance 102, 104, 106 is schematically illustrated. As indicated previously, the appliances operate in the normal mode during the off-peak period and operate in the energy savings mode during the peak demand period. The operation of the appliances 102, 104, 106 in the normal mode is represented by lines 142, 144, 146 and the operation of the appliances in the energy savings mode is represented by lines 152, 154, 156. Reference number 160 schematically illustrates the current draw or load of the utility. When the appliances are operating in the normal mode, the current draw or load of the utility is shown at 162. When the appliances are operating in the energy savings mode, the current draw or load of the utility is shown at 164. Each appliance will instantaneously return to the normal mode at the end of the peak demand period. These return points are shown by load shifts 172, 174, 176. However, as indicated previously, the switching of the operating mode from the energy savings mode back to the normal mode for each appliance immediately after a change in the utility state can create a tremendous load on the utility. As shown, the utility load spikes at 180 as the appliances simultaneously return to the normal mode. It should be appreciated that the reason the peak demand curve increases prior to the end of the control window or peak demand period is because some appliances, such as a refrigerator, will return to their normal power consumption state earlier than others (as the compartment temperatures exceed the new setpoint) due to door openings, gasket leakage, or other conditions that increase the heat leakage of the overall refrigerated space. This initial influx of current for the appliances can compromise the integrity of the power grid and, at when the power grid is fully loaded, result in a reduction or shut off in the power supplied to consumers. According to the present disclosure, the controller 110 is configured to control the return of the appliances 102, 104, 106 to the normal operating mode after the peak demand period is over to prevent an energy surge for the associated energy supplying utility.

Particularly, the controller 110 is configured to randomize the return of the appliances 102, 104, 106 to the normal operating mode to prevent the problems associated with the instantaneous return. The return time of each appliance is offset so as to shift the current draw for each device to minimize the utility load over time. In this exemplary example, appliance 102 has a first offset 192, appliance 104 has second larger offset 194 and appliance 106 has an even larger third offset 196. These offsets are shown by the distance between the load shifts 172, 174, 176 and 172', 174', 176', respectively. As the consumption load for each appliance is separated by random offsets, the current spike 180 does not appear. Rather, the increase in current drawn by the combination of appliances 102, 104, 106 is shown by sloping curve 190. To randomize the return, the offsets 192, 194, 196 are based at least partially on a serial number of each appliance. The controller 110 is configured to utilize the assigned characters of the serial number of each appliance and then create and/or prescribe a randomization timeframe for returning each appliance to the normal operating mode after the peak demand period is over. The randomization timeframe can be a fixed value of a predetermined number of minutes based on the serial number. According to one exemplary embodiment, the randomization timeframe is at least partially based on the last character of the serial number of each appliance and is from 0 to 9 minutes using the last character of the serial number. An exemplary table is provided below wherein the last character of the serial number is a number or a letter.

| Last Character of Serial Number | Randomization Timeframe or Offset |
| --- | --- |
| 0, A, K, U | 0 minutes |
| 1, B, L, V | 1 minute |
| 2, C, M, W | 2 minutes |
| 3, D, N, X | 3 minutes |
| 4, E, O, Y | 4 minutes |
| 5, F, P, Z | 5 minutes |
| 6, G, Q | 6 minutes |
| 7, H, R | 7 minutes |
| 8, I, S | 8 minutes |
| 9, J, T | 9 minutes |

According to another exemplary embodiment, the randomization timeframe is at least partially based on the last two characters of the serial number of each appliance and is from 0 to 99 minutes using the last two characters of the serial number. For example, when the last two characters are numbers, appliance having 00 will have an offset of 0 minutes and will immediately return to the normal mode. Appliance having 01 will have an offset of 1 minute before returning to the normal mode. The controller 110 can reduce the randomization timeframe by dividing the last two characters of the serial number by a predetermined integer and then rounding to the nearest whole number. In both exemplary embodiment, the controller 110 is configured to alert a user of the prescribed randomization timeframe for returning each appliance to the normal operating mode.

Regarding appliance 104, as indicated previously, this appliance can include the refrigeration system 108 having a setpoint temperature, such as a refrigerator or HVAC system. The refrigeration system 108 has a setpoint temperature in the normal operating mode. The controller 110 is configured to adjust the setpoint temperature to an adjusted temperature in the energy savings mode and return to the setpoint temperature from the adjusted temperature over a predetermined timeframe. To reduce the power consumption of the appliance 106 in the energy savings mode, the controller 1110 is configured to adjust (increase or decrease) the setpoint temperature to precipitate less refrigeration system on time (i.e., compressor on time) in the energy savings mode. For example, if the appliance is an HVAC system that is being used to cool room air, the controller 110 can increase the setpoint temperature. If the HVAC system includes a heat pump cycle to heat the room air, the controller can decrease the setpoint temperature. To precipitate less compressor on time, according to one aspect, a duty cycle of the compressor can be adjusted (for example, by time or by setpoint) in the energy savings mode. According to another aspect, to reduce the current draw of the compressor in the energy savings mode, the speed and/or capacity of the compressor can be varied or reduced. According to yet another aspect, the refrigeration system 108 can be temporarily deactivated in the energy savings mode. As shown in FIG. 2, the return to the setpoint temperature can be an immediate return at 174' or a gradual return over time at 174". To this end, the controller 110 is configured to incrementally adjust the temperature back to the setpoint temperature over a predetermined timeframe, for example, 2° per minute. The incremental adjustment of the temperature and the predetermined timeframe can be at least partially based on the serial number randomization of appliance 106 described above.

Figure 3:
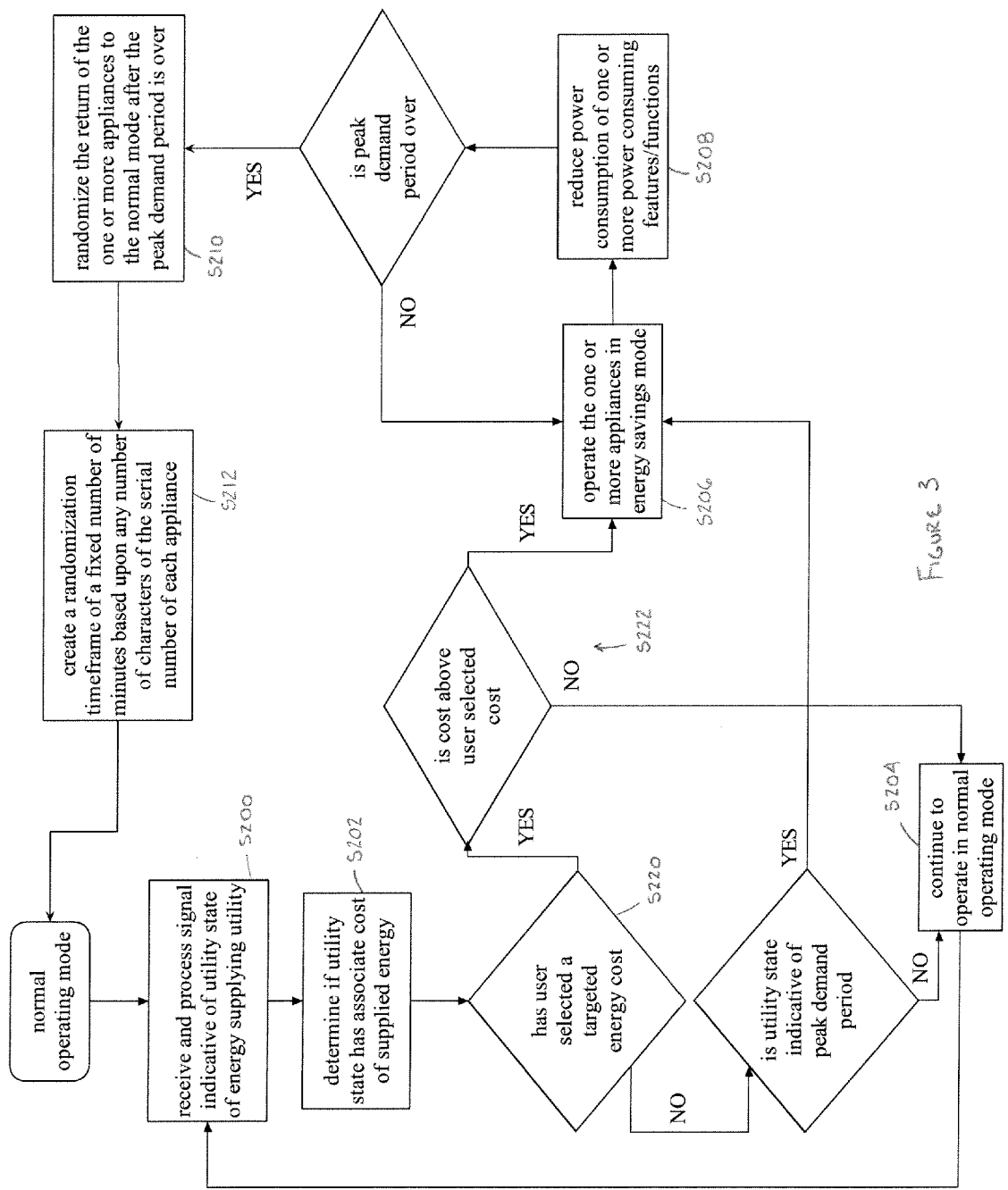
FIG. 3 is an exemplary operational flow charts for the central air conditioning of FIG. 2.

With reference to FIG. 3, a energy management control method for the one or more appliances 102, 104, 106 in accordance with one aspect of the present disclosure comprises receiving and processing the signal indicative of cost of supplied energy (S200); determining a state for an associated energy supplying utility (S202), such as a cost of supplying energy from the associated utility, the utility state being indicative of at least a peak demand period or an off-peak demand period; operating the one or more appliances in a normal mode during the off-peak demand period (S204); operating the one or more appliances in an energy savings during the peak demand period (S206); selectively adjusting and/or deactivating any number of one or more power consuming features/functions of the system to reduce power consumption of the system in the energy savings mode (S208); and randomizing the return of the one or more appliances to the normal mode after the peak demand period is over to prevent an energy surge for the associated energy supplying utility (S210).

The control method further comprises creating and/or prescribing a randomization timeframe of a fixed number of minutes based upon any number of characters of a serial number of each of the one or more appliances (S212). According to one exemplary aspect, a randomization timeframe from 0 to 9 can be created minutes using the last character of the serial number. According to another exemplary aspect, a randomization timeframe from 0 to 99 minutes can be created using the last two character of the serial number. This randomization timeframe can be reduced by dividing the last two characters of the serial number by a predetermined integer and then rounding to the nearest whole number.

It is to be appreciated that a manual or selectable override can be provided on the user interface 120 providing a user the ability to select which of the one or more power consuming features/functions of each appliance 102, 104, 106 are delayed, adjusted and/or disabled by the controller in the energy savings mode. The user can override any adjustments, whether time related or function related, to any of the power consuming functions. Further, the user can override the current operating mode of each appliance. Particularly, as shown in FIG. 3, if the utility state has an associated energy cost, the user can base operation of each appliance on a user selected targeted energy cost, such a selected pricing tier or cost per kilowatt hour charged by the corresponding utility (S220). If the current cost exceeds the user selected cost, the controller 110 will operate each appliance 102, 104, 106 in the energy savings mode (S222 and S206). If the current cost is less than the user selected cost, the controller 110 will operate each appliance 102, 104, 106 in the normal mode (S204). This operation based on a user selected targeted energy cost is regardless of the current energy cost being indicative of one of a peak demand period and an off-peak demand period.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An energy management system, comprising:
    a household controller;
    a user interface operably connected to the household controller; and
    a plurality of household appliances operatively connected to the household controller;
    wherein the household controller manages power consumption of each of the plurality of household appliances within a household, the household controller being configured to receive a targeted energy cost selected by a user via the user interface for the plurality of household appliances and to receive and process an energy signal indicative of one or more energy parameters of an associated energy supplying utility, including at least a peak demand period or an off-peak demand period and current energy cost, the household controller configured to control the plurality of household appliances in one of a plurality of operating modes, including at least a normal operating mode and an energy savings mode,
    and wherein the household controller controls each of the plurality of household appliances to operate in the normal operating mode during the off-peak demand period, and to operate in the energy savings mode when the current energy cost exceeds the targeted energy cost, wherein the household controller is configured to create a randomization timeframe based on at least a portion of a serial number of each appliance, and wherein the household controller controls the return of the plurality of household appliances to the normal operating mode when the current energy cost falls below the targeted energy cost based on the randomization timeframe to prevent an energy surge for the associated energy supplying utility,
    the randomization timeframe being a fixed value of a predetermined number of minutes based on at least one character of the serial number.

2. The energy management system and method of claim 1, wherein the randomization timeframe is at least partially based on the last character of the serial number of each appliance.

3. The energy management system and method of claim 2, wherein the randomization timeframe is from 0 to 9 minutes using the last character of the serial number.

4. The energy management system and method of claim 1, wherein the randomization timeframe is at least partially based on the last two characters of the serial number of each appliance.

5. The energy management system and method of claim 4, wherein the randomization timeframe is from 0 to 99 minutes using the last two characters of the serial number.

6. The energy management system and method of claim 1, wherein the household controller is configured to utilize the assigned characters of the serial number of each appliance and then prescribe the randomization timeframe for returning each appliance to the normal operating mode after the peak demand period is over.

7. The energy management system and method of claim 1, wherein at least one appliance of the one or more appliances includes a refrigeration system having a setpoint temperature, wherein the controller is configured to adjust the setpoint temperature to an adjusted temperature in the energy savings mode, wherein the controller is configured to return to the setpoint temperature from the adjusted temperature over a predetermined timeframe.

8. The energy management system and method of claim 7, wherein the controller is configured to incrementally adjust the temperature back to the setpoint temperature over the predetermined timeframe.

9. An energy management control method, comprising:
    receiving, by a household controller from a user interface, a targeted energy cost selected by a user;
    receiving, by the household controller, an energy signal from an energy supplying utility;
    determining, by the household controller based on the energy signal, a current energy cost and a state for an associated energy supplying utility, the utility state being indicative of at least a peak demand period or an off-peak demand period;
    operating, by the household controller, a plurality of household appliances in a normal mode during the off-peak demand period;
    operating, by the household controller, the plurality of household appliances in an energy savings mode when the current energy cost exceeds the targeted energy cost; and
    randomizing, by the household controller, the return of the plurality of household appliances to the normal mode when the current energy cost falls below the targeted energy cost by utilizing at least one character of a serial number of the one or more appliances and prescribing a randomization timeframe associated with the at least one character for returning to the normal mode to prevent an energy surge for the associated energy supplying utility,
    the randomization timeframe being a fixed value of a predetermined number of minutes based on at least one character of the serial number.

10. The energy management control method of claim 9, further including creating a randomization timeframe of a fixed number of minutes based upon any number of characters of the serial number.

11. The energy management control method of claim 10, further including creating a randomization timeframe from 0 to 9 minutes using the last character of the serial number.

12. The energy management control method of claim 10, further including creating a randomization timeframe from 0 to 99 minutes using, the last two character of the serial number.

* * * * *

UNITED STATES PATENT AND TRADEMARK OFFICE
CERTIFICATE OF CORRECTION

| | | |
|---|---|---|
| PATENT NO. | : 8,818,566 B2 | Page 1 of 1 |
| APPLICATION NO. | : 12/644922 | |
| DATED | : August 26, 2014 | |
| INVENTOR(S) | : Besore et al. | |

It is certified that error appears in the above-identified patent and that said Letters Patent is hereby corrected as shown below:

In the Claims

In Column 9, Line 10, in Claim 12, delete "using, the" and insert -- using the --, therefor.

Signed and Sealed this
Twenty-eighth Day of April, 2015

Michelle K. Lee
*Director of the United States Patent and Trademark Office*